United States Patent [19]

Wisner

[11] Patent Number: 4,927,249

[45] Date of Patent: May 22, 1990

[54] ELECTROMECHANICAL LIGHT CHOPPER ARRANGEMENT

[75] Inventor: George R. Wisner, Deep River, Conn.

[73] Assignee: United Technologies Corporation, Hartford, Conn.

[21] Appl. No.: 289,109

[22] Filed: Dec. 23, 1988

[51] Int. Cl.$^5$ ............................................. G02B 26/00
[52] U.S. Cl. ..................................... 350/486; 350/611
[58] Field of Search ................ 350/486, 607, 610, 611

[56] References Cited

PUBLICATIONS

Sato et al., "Adaptive PVDF Piezoelectric Deformable Mirror System"; Applied Optics, vol. 19, No. 9, 5/1980, pp. 1430–1434.
Simmons et al., "Application of Helenoid Actuators to Deformable Mirrors", Applied Optics, vol. 19, No. 9, 5/1980, pp. 1388–1390.

Primary Examiner—Bruce Y. Arnold
Assistant Examiner—Rebecca D. Gass
Attorney, Agent, or Firm—Peter R. Ruzek

[57] ABSTRACT

An arrangement for chopping a collimated beam of light traveling in an initial path, includes a flexible mirror which reflects substantially all of the light from the initial path into an auxiliary path in a first configuration thereof. The flexible mirror is deformed by a magneto-distortive actuator from its first configuration to a second configuration in which it disperses the light reaching it in such a manner that all but a minute fraction of the dispersed light propagates outside the path. Further propagation of the light that is reflected by the flexible mirror to the outside of the auxiliary path along the auxiliary path is blocked by an aperture plate having an apeture through which all of the light reflected by the flexible mirror passes when the flexible mirror has its first configuration.

9 Claims, 1 Drawing Sheet

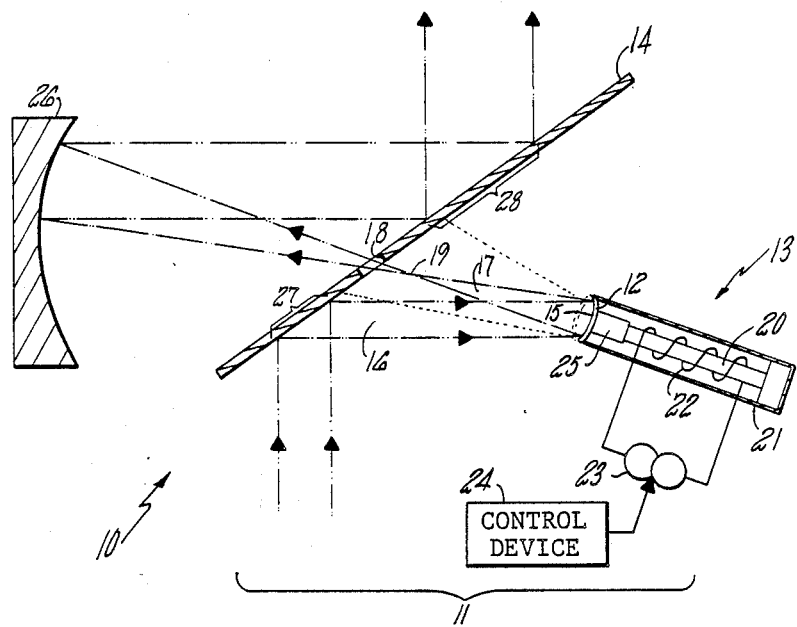

ELECTROMECHANICAL LIGHT CHOPPER ARRANGEMENT

DESCRIPTION

1. Technical Field

The present invention relates to optical systems in general, and more particularly to a light chopper arrangement for use in optical systems.

2. Background Art

There are already known various constructions of light chopping arrangements for use in optical systems to control the propagation of light in such systems. Arrangements of this type may be used, for example, to generate arbitrary modulation sequences in the light propagating through and exiting from such systems. Typically, such light chopping arrangements are constructed to operate on an electromechanical basis, that is, an electrical drive signal is being used to cause displacement of a mechanical shutter across the path of propagation of the light beam to selectively obscure the light beam and permit its further propagation through the optical system, respectively, as needed to provide the light beam with the desired modulation or for other similar purposes. Obviously, the shutter, which may be constituted by a chopper blade, must be able to perform a sufficient stroke to achieve the desired total or almost total obscuration of the light beam.

Experience with electromechanical light chopping arrangements of this kind has shown that the speed of response thereof to the driving signals and to changes in the values of such signals is dependent on the mechanical resonance frequency of the light chopping arrangement which, in turn, is determined by the inertial and restoring spring forces encountered in the light chopping arrangement during its operation. Now, inasmuch as it is desired or even necessary to achieve a high contrast or extinction ratio (in many instances in excess of 2000:1) between the amount of light transmitted in an optical system of the above type when the shutter is in its retracted position in which it is spaced from the light beam, on the one hand, and when the shutter is in its extended position in which it substantially completely obscures the light beam, on the other hand, the stroke of the shutter must be relatively huge in relation to the overall chopping arrangement dimensions, so that the inertial and spring forces, of necessity, have commensurate relatively considerable magnitudes.

Of course, the speed or immediacy of the response of the chopping arrangement to the incoming driving signals also depends on the type of actuator used for displacing the shutter. In the recent past, there have been developed actuator constructions which have very quick response times, among them so-called magnetostrictive or magnetodistortive actuators. An actuator of the latter type, such as that disclosed in the commonly owned U.S. Pat. No. 4,585,978, includes an elongated core of a magnetodistortive material which changes its length in response and substantially proportionately to the strength of a magnetic field applied thereto, and a solenoid coil surrounding the core and generating the magnetic field of the desired magnitude. A transmission element interposed between one end of the magnetodistortive core and the member to be displaced then transmits the motion of the one core end to such member.

It has been established that, as desirable as it would be to employ an actuator of this type for displacing the shutter in the aforementioned chopping arrangement, because of its quick response time and very low magnitudes of inertial and spring forces associated therewith, the shutter stroke required to achieve the above extinction ratio when moving the shutter across the light beam is at if not beyond the achievable core extension limit of an actuator of this type. Moreover, the greater the required stroke, the more massive is the actuator, and the greater are the inertial and requisite restoration spring forces, which at least partially defeats the purpose of using an actuator of this type in the first place.

Accordingly, it is a general object of the present invention to avoid the disadvantages of the prior art.

More particularly, it is an object of the present invention to provide a light chopping arrangement which does not possess the disadvantages of the known arrangements of this kind.

Still another object of the present invention is to develop the light chopping arrangement of the type here under consideration as to be able to use short displacement but quick response time actuators therein.

It is yet another object of the present invention to devise a light chopping arrangement of the above type which lends itself to use in optical systems in which a very high extinction ratio is desired or mandatory.

A concomitant object of the present invention is to design the arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an arrangement for chopping a collimated beam of light traveling in an initial path. According to the invention, this arrangement includes means for reflecting the light of the beam, such reflecting means including at least one flexible mirror which reflects substantially all of the light from the initial path into an auxiliary path in a first configuration thereof. There is further provided means for deforming the flexible mirror from the first configuration to a second configuration in which the flexible mirror disperses the light such that all but a minute fraction of the thus dispersed light propagates outside the auxiliary path, and means for blocking further propagation along the auxiliary path of that of the light that is reflected by the flexible mirror to the outside of the auxiliary path.

As a result of the above-described features of the light chopping arrangement, and especially of the use of the flexible mirror coupled with the use of an actuator that changes the configuration of the flexible mirror, there is obtained a very simple and light-weight light chopping arrangement which requires only a very small extent of stroke from its actuator, thus rendering it possible to use a relatively short stroke but quick response and low mass actuator, such as that of the magnetodistortive type.

BRIEF DESCRIPTION OF THE DRAWING

The present invention will be described in more detail below with reference to the accompanying sole FIGURE of the drawing which is a somewhat diagrammatic side elevational view of a part of an optical system which employs a light chopping arrangement embodying the present invention.

BEST MODE FOR CARRYING OUT THE INVENTION

Referring now to the sole FIGURE of the drawing in detail, it may be seen that the reference numeral 10 has been used therein to identify an optical system embodying the present invention. The optical system 10 includes a light chopping arrangement 11 that essentially consists of a flexible mirror 12, an actuator 13 for the flexible mirror 12, and an aperture plate 14.

The flexible mirror 12 may be of any known material that has shape-retaining capability sufficient to assure that a reflecting surface 15 of the mirror 12 has a smooth contour at least when the mirror 12 assumes its first spatial configuration in which the reflecting surface 15 reflects light approaching the same in an initial path 16 into an auxiliary path 17 which passes through an aperture 18 present in the aperture plate 14. On the other hand, the material of the flexible mirror 12 is flexible enough to permit temporary deformation of the mirror 12 from its aforementioned first configuration to its second configuration in which the reflecting surface 15 disperses the light reaching it from the initial path 16 to such an extent that all but a minuscule fraction of such reflected light propagates at the outside of the auxiliary path 17 and thus never passes through the aperture 18 to the other side of the aperture plate 14.

The flexible mirror 12 is shown in the drawing, in a manner that has been slightly exaggerated for illustrative purposes, in solid lines in a possible first configuration thereof, and in broken lines in a possible second configuration thereof. The reflecting surface 15 is concave in the illustrated first configuration, and convex in the illustrated second configuration, of the mirror 12. However, it is to be realized that the reflecting surface 15 could be flat or even slightly convex in the first configuration of the flexible mirror 12, especially if the light traveling in the initial path 16 were converging on its approach of the reflecting surface 15, and convex or more convex in the second configuration of the flexible mirror 12, or even concave in the first configuration and less concave in the second configuration of the flexible mirror 12.

In any event, it is currently preferred to coordinate the behavior of the light when traveling in the initial path 16 with the contour of the reflecting surface 15 in the first configuration of the mirror 12 in such a manner that the light traveling in the auxiliary path 16 under these conditions converges to a focal region 19 of the auxiliary path 17 which is situated at said aperture plate 14 or advantageously in the aperture 18. Thus, as illustrated, the light traveling in the initial path 17 is collimated, and the reflective surface 15 of the flexible mirror 12 is significantly concave. This expedient renders it possible to make the size of the aperture 18 very small, that is, just large enough that the thus focused light is able to pass through the aperture 18 while further propagation of any light travelling along but outside the auxiliary path 17 to the other side of the aperture plate 14 is blocked by the aperture plate 14. The result of this is that the light dispersed by the reflective surface 15 of the flexible mirror 12 when the flexible mirror 12 assumes its second configuration is intercepted (i.e. either absorbed or reflected) by the aperture plate 14, except for a minuscule and negligible fraction of such dispersed light that is still able to reach and pass through the aperture 18 of the aperture plate 14 to the other side of the aperture plate 14. In any event, the smaller the aperture 18, the smaller is the fraction of the dispersed light that is able to propagate through the aperture 18 to the other side of the aperture plate 14 and, by the same token, the larger is the extinction ratio. In this respect, the focusing of the light reflected by the reflecting surface 15 in the first configuration of the flexible mirror 12 into the aperture 18 is especially advantageous because it renders it possible to minimize the size of the aperture 18 within the realm of what is possible or feasible considering that it is usually desired for the aperture plate 14 not to interfere with the passage of light through the aperture 18 when the flexible mirror 12 has its first configuration.

The actuator 13 may have any known construction, but it is particularly advantageous when it is constructed, as indicated in the drawing, as an electromechanical actuator, especially as a magnetodistortive or magnetostrictive actuator. A complete description of a magnetostrictive actuator and associated circuitry which may be used to advantage in the light chopping arrangement 11 of the present invention is presented in the aforementioned U. S. Patent the disclosure of which is incorporated herein by reference to the extent required to provide the details of construction and operation of the magnetostrictive actuator 13. Suffice it to say here that the actuator 13 includes an elongated core 20 of a magnetostrictive or magnetodistortive material, such as that commercially available under the designation Terfenol. The core 20 is supported in any known manner in a housing 21 such that the end of the elongated core 20 that is remote from the flexible mirror 12 is stationary with respect to the housing 21 while the other end of the core 21 is free to conduct axial movement relative to the housing 21. As illustrated in the drawing, the flexible mirror 12 is also mounted on the housing 21 and spans an open end thereof.

The axial movement of the free end of the core 20 results from the application of a magnetic field to the magnetostrictive core 20 with attendant increase in the axial length of the core 20. The requisite magnetic field which results in an increase in the axial length of the core by the required amount is applied by a solenoid coil 22 which is accommodated in the housing 21 and surrounds the magnetostrictive core 20. The electric current that is needed to energize the solenoid coil 22 to the desired extent is supplied by a current driver or power source 23 which, in turn, is controlled, in any well-known manner that need not be disclosed in detail here, by a control device 24 which may be constituted by as simple an arrangement as a switch, in view of the fact that it is usually sufficient to supply either no electric current whatsoever or the full available amount of electric current to the solenoid coil 22.

The axial movement of the free end of the core 20 is transmitted to the flexible mirror 12 by a transmission element 25 which is also accommodated and supported in the interior of the housing 21. Depending on the type of movement of the flexible mirror 12 between its end positions or configurations, the transmission element 25 may be either merely interposed between the free end of the core 20 and the flexible mirror 12 (if the mirror has a tendency to return and is capable of returning in an unhindered fashion from its second configuration to its first configuration), or also connected (such as bonded) to the free end of the core 20 and/or to the mirror 12. Furthermore, a non-illustrated retraction spring may be provided, for instance in the housing 21, to assist in retraction of the transmission element 25 and/or return of the flexible mirror 12 to its first configuration after the solenoid coil 22 has been de-energized.

As illustrated, the light passing through the aperture 18 of the aperture plate 14 in the auxiliary path 17 eventually reaches a concave mirror 26 which recollimates the previously focused light traveling in the auxiliary path 17. On the other hand, the minute fraction of the dispersed light that has been able to pass through the aperture 18 reaches the concave mirror 26 at such angles of incidence that it is further dispersed or at least not collimated. This further reduces the fraction of the dispersed light that is able to reach the ultimate destination.

In the illustrated optical system 10, the aperture plate 14, or at least selected regions thereof, such as 27 and 28, is or are reflective to the light of the light beam, so that the regions 27 and 28 act as mirrors for the incoming and the outgoing light, respectively.

As a result of the above-discussed construction of the light chopping arrangement 11, it is possible to achieve a frequency of operation or on-off modulation in and above the range of several kilohertz, as required in some applications. Also, inasmuch as a relatively short stroke is required from the actuator 13 to deform the flexible mirror 12 from its first to its second configuration, the size of the actuator 13 and thus the mass and spring forces associated therewith can be minimized. Last but not least, the high force generation characteristic of the magnetostrictive material are being utilized optimally in the above-described chopping arrangement construction.

While the present invention has been illustrated and described as embodied in a particular construction of a light chopping arrangement and associated optical system, it will be appreciated that the present invention is not limited to this particular example; rather, the scope of protection of the present invention is to be determined solely from the attached claims.

I claim:

1. An arrangement for chopping a collimated beam of light traveling in an initial path, comprising
   means for reflecting the light of said beam, including a flexible mirror which reflects substantially all of said light from said initial path into an auxiliary path in a first configuration thereof;
   means for deforming said flexible mirror from said first configuration to a second configuration in which said flexible mirror disperses said light such that all but a minute fraction of the so dispersed light propagates outside said auxiliary path; and
   means for blocking further propagation along said auxiliary path of that of said light that is reflected by said flexible mirror to the outside of said auxiliary path.

2. The arrangement as defined in claim 1, wherein said blocking means bounds an aperture for a substantially fitting passage of a portion of said auxiliary path therethrough.

3. The arrangement as defined in claim 2, wherein said flexible mirror has a reflecting surface which is concave in said first configuration of said flexible mirror to concentrate said light reflected therefrom as such light approaches said aperture, and convex in said second configuration of said flexible mirror.

4. The arrangement as defined in claim 3, and further comprising means for recollimating said light subsequent to its passage through said aperture.

5. The arrangement as defined in claim 4, wherein said recollimating means includes a concave mirror.

6. The arrangement as defined in claim 1, wherein said deforming means includes an electrically energizable actuator connected to said flexible mirror, and means for selectively energizing said actuator.

7. The arrangement as defined in claim 6, wherein said actuator includes an elongated core of a material which changes its longitudinal dimension when subjected to an electromagnetic field, and a transmission element connected to said core and to said flexible mirror; and wherein said energizing means includes means for selectively subjecting said core to an electromagnetic field of a magnitude sufficient to cause such a change in the longitudinal dimension of said core that said transmission element deforms said flexible mirror from said first to said second configuration thereof.

8. The arrangement as defined in claim 7, wherein said material of said core is magnetodistortive; and wherein said subjecting means includes a coil surrounding at least said core and means for selectively supplying electric current to said coil to generate said electromagnetic field.

9. The arrangement as defined in claim 6, wherein said flexible mirror has a substantially circular periphery and a central region centered with respect to said periphery; and wherein said transmission element acts on said central region of said flexible mirror.

* * * * *